(12) United States Patent
Ozawa et al.

(10) Patent No.: US 10,685,266 B2
(45) Date of Patent: Jun. 16, 2020

(54) CARD READER AND FOREIGN MATTER DETECTION METHOD THEREOF

(71) Applicant: NIDEC SANKYO CORPORATION, Suwa-gun Nagano (JP)

(72) Inventors: Shigeki Ozawa, Suwa-gun Nagano (JP); Takeki Watanabe, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/058,353

(22) Filed: Aug. 8, 2018

(65) Prior Publication Data

US 2019/0385028 A1    Dec. 19, 2019

(30) Foreign Application Priority Data

Aug. 8, 2017    (JP) ................. 2017-153175

(51) Int. Cl.
*G06K 7/08* (2006.01)
*G06K 13/08* (2006.01)
*G06K 7/00* (2006.01)

(52) U.S. Cl.
CPC ....... *G06K 13/0875* (2013.01); *G06K 7/0078* (2013.01); *G06K 7/084* (2013.01)

(58) Field of Classification Search
CPC ....... H03K 17/962; H03K 2217/96079; H03K 17/16; H03K 17/9622; H03K 2217/960715; H03K 2217/960725; H03K 2217/960755; G06F 3/044; G06F 21/32; G06F 21/83; G06F 2203/04103; G06F 2203/04106; G06F 3/03547; G06F 3/045; G06K 19/06206; G06K 13/0868; G06K 7/087; G06K 9/0002; G06K 13/0875; G06K 7/084; G06K 7/0078; G06Q 20/341; G06Q 20/3415; G06Q 20/3572
See application file for complete search history.

(56) References Cited

U.S. PATENT DOCUMENTS

2009/0224776 A1* 9/2009 Keith .................... H03K 17/962
                                                                 324/686
2012/0092350 A1* 4/2012 Ganapathi .......... G02B 26/0833
                                                                 345/501
(Continued)

FOREIGN PATENT DOCUMENTS

JP       H09043187 A       2/1997
JP       2016110415 A      6/2016

*Primary Examiner* — Thien M Le
(74) *Attorney, Agent, or Firm* — Cantor Colburn LLP

(57) ABSTRACT

A card reader for use with a card having a magnetic stripe may include a card insertion port; a card passage through which the card inserted from the card insertion port passes, the card passage being connected to the card insertion port; a magnetic head configured to perform at least one of: recording magnetic data to the magnetic stripe of the card and reading magnetic data from the magnetic stripe of the card; a capacitive sensor provided in contact with the card passage; and a movable structure structured such that a distance to the capacitive sensor is variable. The capacitive sensor may include a plurality of regions, each of the plurality of regions being structured to detect a capacitance, and a switch circuit configured to electrically connect and disconnect each region of the plurality of regions.

12 Claims, 5 Drawing Sheets

(56) References Cited

U.S. PATENT DOCUMENTS

| | | | |
|---|---|---|---|
| 2013/0062410 A1* | 3/2013 | Mitchell | G06K 13/0868 |
| | | | 235/449 |
| 2013/0141387 A1* | 6/2013 | Royhob | G06F 3/044 |
| | | | 345/174 |
| 2013/0320080 A1* | 12/2013 | Olson | H04W 76/10 |
| | | | 235/380 |
| 2016/0372278 A1* | 12/2016 | Guo | H01H 9/542 |
| 2018/0240103 A1* | 8/2018 | Rezayee | G06Q 20/341 |
| 2018/0266978 A1* | 9/2018 | Salter | B32B 17/10385 |

* cited by examiner

CARD READER AND FOREIGN MATTER DETECTION METHOD THEREOF

CROSS REFERENCE TO RELATED APPLICATION

The present application claims priority under 35 U.S.C. § 119 to Japanese Application No. 2017-153175 filed Aug. 8, 2018, the entire content of which is incorporated herein by reference.

TECHNICAL FIELD

At least an embodiment of the present invention relates to a card reader configured to read data from a card such as a magnetic card, and relates also to a foreign matter detection method of detecting insertion of a foreign matter into the card reader.

BACKGROUND

To read magnetic data recorded on a magnetic card and to record data onto the magnetic card, a card reader is widely used. As an application of the magnetic card, there is a cash card used for a transaction with a financial institution, for example. In recent years, a so-called skimming becomes a serious social problem where a criminal attaches a magnetic head to an insertion unit of the card reader to steal data recorded on the magnetic card. Although a countermeasure against the attachment of the magnetic head for skimming to the card insertion unit is underway, a criminal technique for skimming is also sophisticated, and there is a concern that the magnetic head for skimming is placed inside the card reader. Therefore, as a technique for detecting placement of a foreign matter such as the magnetic head inside the card reader, Patent Document 1 discloses arrangement of a capacitive sensor along a card passage inside the card reader. As a capacitive sensor to be arranged inside the card reader, a thin-type capacitive sensor is required, and thus, that which is configured so that a pair of comb-shaped electrodes or interdigital electrodes are placed on an insulating substrate, and further, its surface is covered with an insulating layer, is used. It is noted that as a capacitive sensor used for measurement of 4-terminal type, Patent Document 2 discloses a capacitive sensor where a pair of comb-shaped electrodes are arranged on an insulating substrate.

PATENT DOCUMENT

Patent Document 1: Japanese Unexamined Patent Application Publication No. 2016-110415
Patent Document 2: Japanese Unexamined Patent Application Publication No. H9-43187

In a method of detecting insertion of a foreign matter into a card reader by using a capacitive sensor, a capacitance change caused along with the foreign matter being arranged inside the card reader is detected. The card reader is internally provided with a roller configured to pressurize and covey a card, a holding member configured to hold the card, and the like, and the roller and the holding member are not fixed to prevent moving, but are movable members changing in position and gesture relative to a card reader main body. In a case of the card reader configured to read a magnetic card with a built-in IC chip, a contact mechanism used for electrical connection with the IC chip is also a movable member. A capacitive sensor is a very delicate sensor, and detects even a capacitance value changing due to a very small relative variance in distance to a target object. Therefore, if the position and the gesture of the movable member are changed, the capacitive sensor may erroneously detect that the foreign matter is attached even though the foreign matter is not attached. There is a need for a mechanism configured to detect the attachment of the foreign matter while reducing an influence of the change in position and gesture of the movable member. On the other hand, in order to detect the foreign matter such as a magnetic head for skimming over a wide range, it is necessary to arrange the capacitive sensors over a wide range inside the card reader. In order to satisfy the need of arranging the capacitive sensor over a wide range and to reduce the influence of the movable member at the same time, a large number of capacitive sensors may be arranged, and in addition, a drive and detection circuit may be arranged for each of the capacitive sensors. However, the drive and detection circuit configured to drive the capacitive sensor to obtain a capacitive value is expensive, and if many drive and detection circuits are arranged, its cost rises.

SUMMARY

At least an embodiment of the present invention provides a card reader capable of reducing an influence of a movable member within in the card reader, and to detect insertion of a foreign matter at a low cost over a wide range inside the card reader, and to provide a foreign matter detection method thereof.

In an aspect of the invention, a card reader includes: a card passage through which a card inserted from a card insertion port passes, the card passage being connected to the card insertion port; a magnetic head configured at least one of: to record magnetic data for a magnetic stripe of the card; and to read the magnetic data from the magnetic stripe; a capacitive sensor provided in contact with the card passage; and a movable structure with a distance to the capacitive sensor being variable, wherein the capacitive sensor is divided into a plurality of regions each of which is capable of detecting a capacitance and includes a switch circuit configured to electrically connect and disconnect each region.

According to such a card reader, it is possible to arrange the plurality of regions of the capacitive sensor in a plurality of locations suitable for a foreign matter detection to thereby widen a detection range of a capacitance, and as a result, it is possible to perform a foreign matter detection over a wide range at low cost.

A plurality of regions of the capacitive sensor of an aspect of the invention includes at least one first region arranged in a position relatively less susceptible to an influence of a movement of the movable structure, and at least one second region arranged in a position relatively susceptible to the influence of the movement of the movable structure. With this configuration, it is possible to perform a foreign matter detection without receiving the influence of the movement of the movable structure by selecting the first region only while widening a detection range, and it is possible to determine the presence or absence of the foreign matter by taking into consideration an influence, if any, of the movable structure due to the second region being connected. In this configuration, a drive and detection circuit configured to drive the capacitive sensor and obtain a capacitance value detected by the capacitive sensor is further provided, and the drive and detection circuit is connected to one of the first regions of the capacitive sensor. As a result, a foreign matter detection not receiving any influence of the movable structure can be unceasingly performed. Further, other regions are connected in series via the switch circuit to a region connected to the drive and detection circuit, out of the plurality of regions of the capacitive sensor. As a result, when the switch circuit is intervened, it is possible to easily switch between a detection of the first region only and a detection over the both regions, and it is possible to share the drive and detection circuit over a plurality of regions, and thus, it is possible to reduce the number of drive and detection circuits.

In at least an embodiment of the present invention, the control circuit is provided which is configured to control the switch circuit, and detect a foreign matter, based on an output from the drive and detection circuit. When the control circuit is provided, it is possible to automate a process of a foreign matter detection, and it is also easy to output a warning that the foreign matter is detected to the outside. At this time, the control circuit performs the foreign matter detection by unceasingly connecting the first region to the drive and detection circuit. As a result, it is possible to unceasingly perform the foreign matter detection with the accuracy suitable for an arrangement situation of the movable structure.

In an aspect of the invention, the control circuit can, for example, if there is a response in the first region while the second region is electrically disconnected from the first region, detect the foreign matter, based on a detection amount in the drive and detection circuit, and if there is no response in the first region while the second region is electrically disconnected from the first region, electrically connect the second region to the first region to detect the foreign matter, based on the detection amount in the drive and detection circuit, and thereafter, electrically disconnects the second region from the first region. At this time, the third threshold value is set to be smaller than the second threshold value. According to such a control, it is possible to implement the foreign matter detection with low sensitivity by using only the first region or only the second region, and it is possible to surely detect a foreign matter that obviously appears to be a foreign matter and it is also possible to prevent an erroneous detection. Further, in a case where even if there is a response in the foreign matter detection in the first region, it is not possible to finalize that this response is the foreign matter, when the foreign matter detection is performed by connecting the second region, it is possible to highly accurately perform the foreign matter detection while preventing an overlook.

Also, in an aspect of the invention, the control circuit can, if there is a response in the first region while the second region is electrically disconnected from the first region, detect the foreign matter, based on a detection amount in the drive and detection circuit by using a first threshold value, if there is no response in the first region while the second region is electrically disconnected from the first region, electrically connect the second region to the first region to detect the foreign matter, based on the detection amount in the drive and detection circuit, by using a second threshold value, and thereafter, electrically disconnects the second region from the first region, and when not able to determine that the foreign matter is detected by the first threshold value, electrically connects the second region to the first region to detect the foreign matter, based on the detection amount in the drive and detection circuit, by using a third threshold value, and thereafter, electrically disconnects the second region from the first region, and the third threshold value is smaller than the second threshold value.

In the card reader of at least an embodiment of the present invention, a plurality of capacitive sensors are arranged and these capacitive sensors are arranged along the traveling direction of the card through the card passage. In the card reader, the card passage is provided with a transport roller and a magnetic head; however, according to such a method of arranging a capacitive sensor, it is possible to reasonably arrange the capacitive sensor so that a wide range within the card reader is used as a detection range while avoiding the transport roller and the magnetic head. For example, the capacitive sensors can be arranged in a position close to the card insertion port and a position at a deeper side as viewed from the card insertion port, respectively. Further, the first region of each of the plurality of capacitive sensors is arranged at one side in a direction orthogonal to the traveling direction of the card, and the second region of each of the plurality of capacitive sensors is arranged at the other side in the direction orthogonal to the traveling direction of the card. In the card reader, the movable structure such as a holding member configured to hold the transport roller often extends along the traveling direction of the card at one side of a width direction of the card passage, and thus, if such an arrangement is introduced, it is possible to more reliably perform the foreign matter detection in consideration of the influence of the movement of the movable structure.

A foreign matter detection method of at least an embodiment of the present invention is a foreign matter detection method in a card reader comprising: a card passage through which a card inserted from a card insertion port passes, the card passage being connected to the card insertion port; a magnetic head configured at least one of: to record magnetic data for a magnetic stripe of the card; and to read the magnetic data from the magnetic stripe; a capacitive sensor provided in contact with the card passage; a movable structure with a distance to the capacitive sensor being variable; and a drive and detection circuit configured to drive the capacitive sensor and obtain a capacitance value detected by the capacitive sensor, wherein the capacitive sensor is divided into a plurality of regions each of which is capable of detecting a capacitance and includes a switch circuit configured to electrically connect and disconnect each region, and the drive and detection circuit is connected to one of the plurality of regions of the capacitive sensor. In the method, a foreign matter is detected, based on a detection amount in the drive and detection circuit while the switch circuit is rendered non-conducting, and if there is no response in the foreign matter detection, while the switch circuit is rendered conducting, the foreign matter is detected again, based on the detection amount in the drive and detection circuit, and thereafter, the switch circuit is rendered non-conducting. According to such a foreign matter detection method, it it is possible to more reliably perform the foreign matter detection over a wide range by reducing the influence from the movable structure or the like while reducing the number of drive and detection circuits. In the foreign matter detection method, out of the plurality of regions of the capacitive sensor, a region to which the drive and detection circuit is connected is a region less susceptible to the influence from the movable structure arranged in the card reader and having a distance to the capacitive sensor being variable, as compared to a region to be connected, via the switch circuit, to the region. With this configuration, it is possible to unceasingly perform the foreign matter detection with accuracy suitable for an arrangement situation of the movable structure.

According to at least an embodiment of the present invention, it is possible to alleviate an influence of a movable member within a card reader and detect a foreign matter at low cost over a wide range within the card reader.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1A is a side view thereof and FIG. 1B is a plan view thereof;

DETAILED DESCRIPTION

Figure 1A:
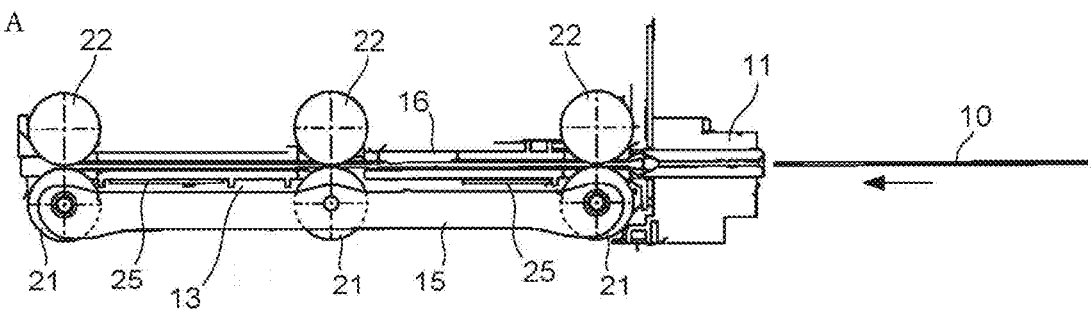
FIG. 1A and FIG. 1B are each drawings for one embodiment of the present invention, respectively, where
Figure 1B:
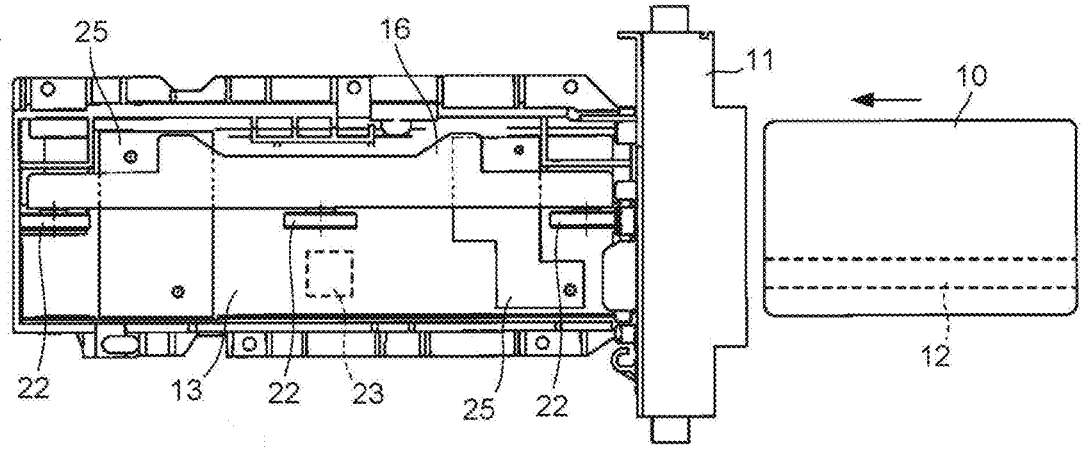

With reference to the drawings, at least an embodiment of the present invention will be described. FIG. 1A and FIG. 1B illustrate a card reader according to one embodiment of the present invention, where FIG. 1A is a side view and FIG. 1B is a plan view. In the card reader, a magnetic head 23 is provided, and a card 10 such as a magnetic card inserted, via a card insertion unit 11, from the right of the figure is drawn into a card passage of a main body of the card reader to read and write data for the card 10. This card reader is arranged in an automatic teller machine (ATM) or the like, for example. The card 10 may be made of vinyl chloride in a rectangular shape with a thickness of about 0.7 mm to 0.8 mm, made of polyethylene terephthalate (PET) with a thickness of about 0.18 mm to 0.36 mm, or the card 10 may also be a paper card with a predetermined thickness, for example. In either way, the card 10 is formed with a magnetic stripe 12 on which data is magnetically recorded. In the card 10, an IC chip or the like may be incorporated.

A card passage portion (card passage) unit in the card reader is a space in which a guide member 13 is defined as a floor surface, and is communicated with a slot-like card insertion port arranged in the card insertion unit 11. In order that the card 10 is drawn into the card passage and the card 10 is removed from the card passage, three pairs of a roller pair comprised of rollers 21, 22 configured to hold and transport the card 10 are arranged, and the roller pairs 21, 22 are driven by a motor 41 (see FIG. 3). The roller 21 is attached to a movable unit 15 attached to the guide member 13, and the roller 22 is attached to a movable unit 16. In the movable units 15, 16, a position may be relatively changed for the guide member 13. The roller pairs 21, 22 are configured to transport the card 10 at a center line position in a longitudinal direction of the card 10, and the movable units 15, 16 are members extending along a movement direction of the card 10. These are arranged at one end side of a width direction of the card 10, as viewed from the center line of the card passage running along the movement direction of the card 10.

The magnetic head 23 is arranged in the guide member 13 at a position with no movable units 15, 16 to slide along the magnetic stripe 12 of the card 10 moving through the card passage. A surface facing the card passage in the guide member 13 is also provided with a capacitive sensor 25 extending in the width direction of the card 10. Here, two capacitive sensors 25 are arranged; however, the number of capacitive sensors 25 arranged in the card reader is not limited to two, and the number may be increased or decreased, where appropriate.

Figure 2:
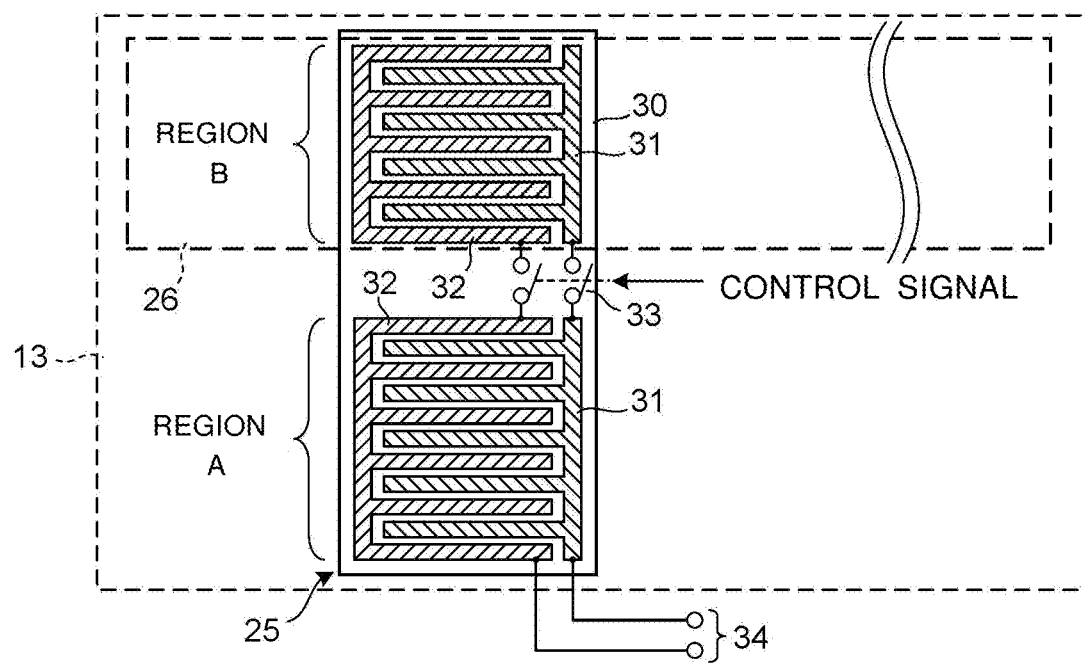
FIG. 2 is a plan view schematically illustrating an example of an arrangement of a capacitive sensor.

FIG. 2 is a diagram illustrating a detailed configuration of the capacitive sensor 25 in the present embodiment. Here, one capacitive sensor 25 is illustrated. As described above, in the movable units 15, 16, a relative distance to the guide member 13 is varied, and the variance in relative distance may be detected by the capacitive sensor 25. In FIG. 2, a region where the movable units 15, 16 are arranged is illustrated as a movable structure approaching area 26. In the movable structure approaching area 26, the capacitive sensor 25 will greatly receive an influence of the movable units 15, 16. Therefore, in the present embodiment, the capacitive sensor 25 arranged to extend in the width direction of the card 10 is divided into two regions, that is, a region A outside of the movable structure approaching area 26, and a region B inside of the movable structure approaching area 26. In the capacitive sensor 25, a pair of comb-shaped electrodes 31, 32 are arranged on an insulating substrate 30 so that teeth portions of the comb are alternated with one another. One pair of comb-shaped electrodes in the region A and one pair of comb-shaped electrodes in the region B are separated from each other, and these regions A, B are electrically connected by a switch circuit 33 in which a conducting/non-conducting state is controlled by a control signal. A pair of output terminals 34 of the capacitive sensor 25 are connected to the pair of comb-shaped electrodes 31, 32 of the region A. As the switch circuit 33, a relay switch, an FET (field effect transistor) switch, or the like may be used. When such a capacitive sensor 25 is used, a capacitance value of the region A outside of the movable structure approaching area 26 can be unceasingly monitored, and a capacitance value of the region B inside of the movable structure approaching area 26 can be monitored where necessary.

Figure 3:
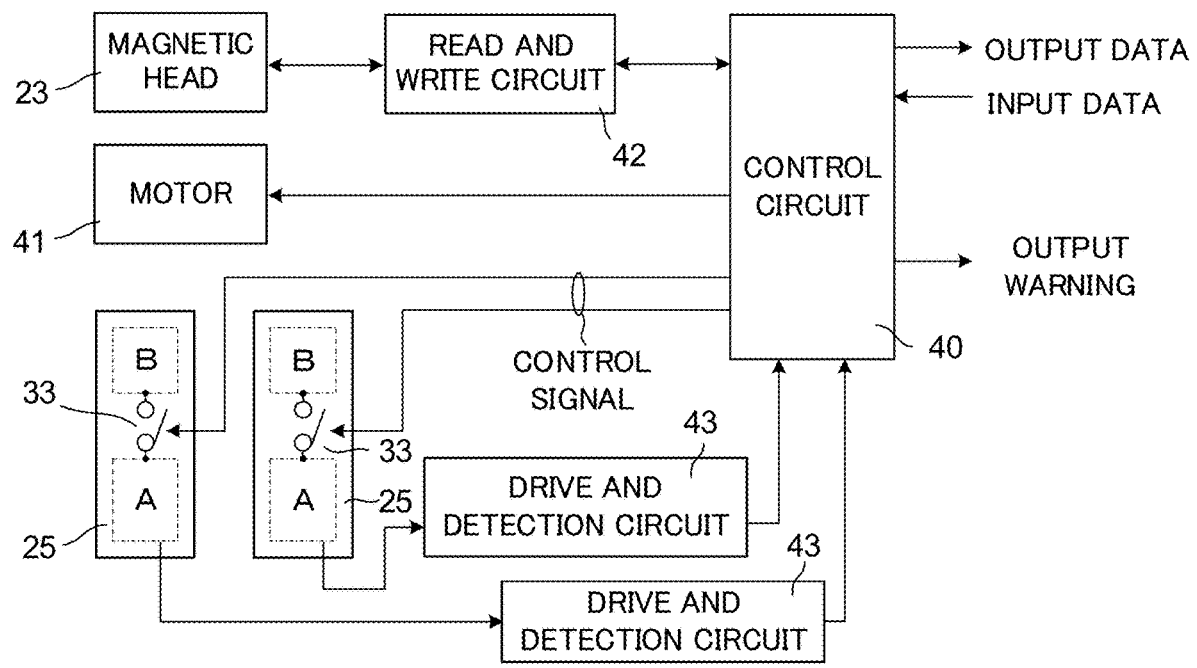
FIG. 3 is a block diagram illustrating a circuit configuration of a card reader.

FIG. 3 illustrates a circuit configuration as an electric circuit of the card reader of the present embodiment. Here, the switches 33 or two wires corresponding to each of the comb-shaped electrodes 31, 32 of one pair of capacitive sensors 25 are indicated by one wire and one switch 33. A drive and detection circuit 43 is arranged for each of the capacitive sensor 25. A control circuit 40 configured to control a whole of the card reader is arranged, and the control circuit 40 is connected, via a read/write circuit 42, to the magnetic head 23 to drive a motor 41. A detection signal from each drive and detection circuit 43 is input to the control circuit 40. The control circuit 40 drives the magnetic head 23 via the read/write circuit 42, based on a data input from outside, reads and writes a record for the card 10, and outputs the data recorded on the card 10 to outside, based on a signal input via the read/write circuit 42 from the magnetic head 23. Further, the control circuit 40 outputs a control signal to each of the capacitive sensors 25, and based on a detection signal from each driving and detecting circuit 43, outputs a warning that a foreign matter is detected inside the card reader.

Figure 4:
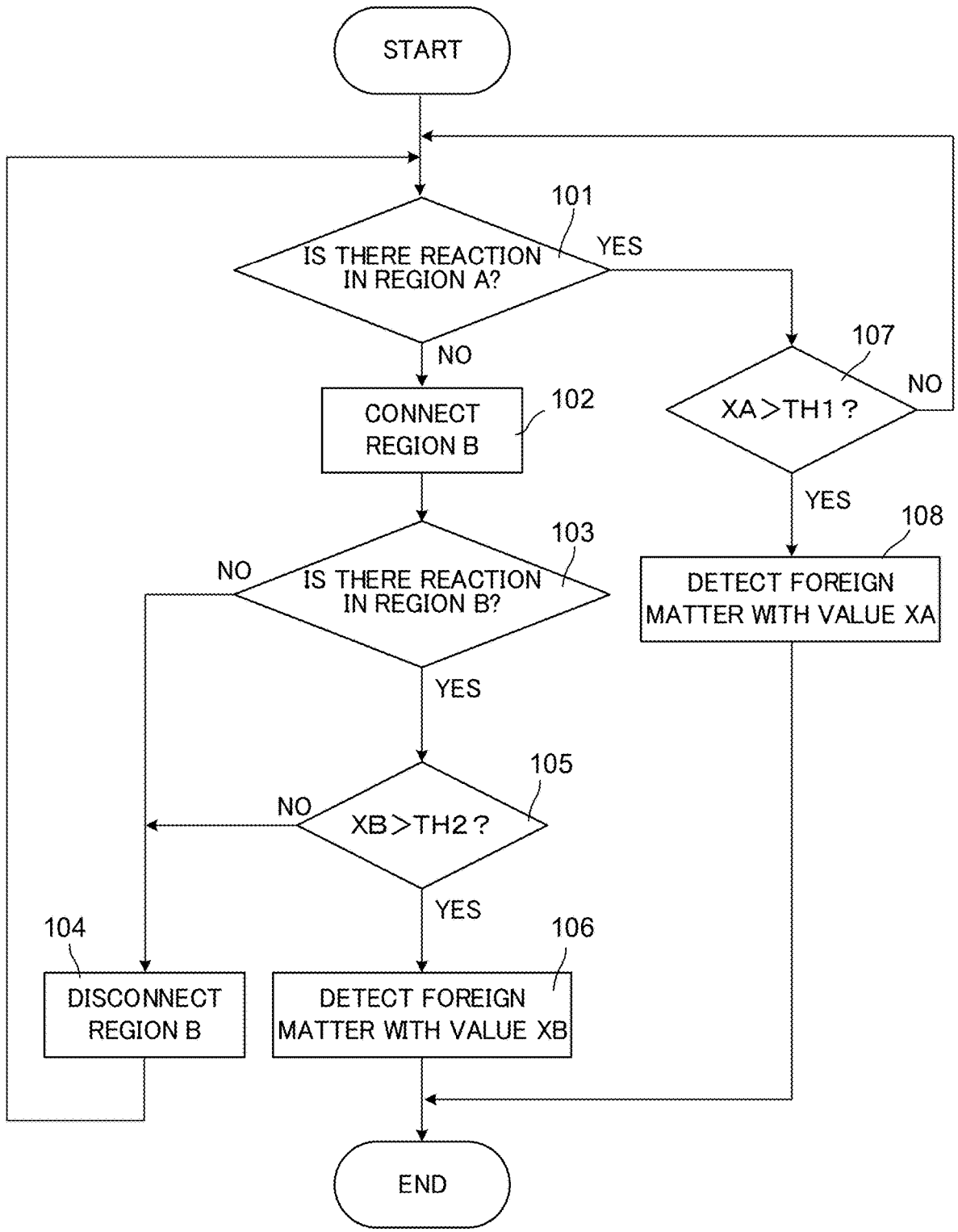
FIG. 4 is a flowchart illustrating an example of a process of a foreign matter detection.

FIG. 4 illustrates an example of a process executed by the control circuit 40 to detect the foreign matter inside the card reader. It is assumed that in an initial state, the switch circuit 33 of the capacitive sensor 25 is non-conducted. Firstly in step 101, the control circuit 40 determines whether or not there is a change in capacitance value in the drive and detection circuit 43. Here, the switch circuit 33 is non-conducted, and thus, a detected response, if any, is a response in the region A of the capacitive sensor 25. If there is no response in the region A, in next step 102, the control signal is output from the control circuit 40, and the switch circuit 33 is rendered conducting so that the region B also is connected, via the region A, to the drive and detection circuit 43. Then, in step 103, it is determined whether in the drive and detection circuit 43, there is a change in capacitance value from an initial value including the region B. It is already confirmed that there is no change in capacitance value in the region A and the region B is connected to the drive and detection circuit 43, and thus, a response detected here is a response in the region B of the capacitive sensor 25. If the response is not detected in step 103, the control circuit 40 determines that there is no foreign matter inside the card reader. In step 104, the control circuit 40 renders the switch circuit 33 non-conducting and disconnects the region B from the region A. Then, in order to repeatedly execute the process of detecting the foreign matter, the control circuit 40 repeats the processes from step 101.

On the other hand, when it is determined in step 103 that there is a response in the region B, it is necessary to determine whether the response is caused by the foreign matter or noise or movement of the movable units 15, 16 or the like. Therefore, in step 105, the control circuit 40 compares a capacitance change amount XB (which corresponds to a capacitance change amount in the region B) detected at this time in the drive and detection circuit 43 with a predetermined slice value (threshold value) TH2. When the capacitance change amount XB is equal to or less than the slice value TH2, it is determined that the capacitance change is not caused by the foreign matter, and similarly to above, the process moves to step 104 to repeat the processes from step 101. On the other hand, in step 105, if the capacitance change amount XB exceeds the slice value TH2, the control circuit 40 determines in step 106 that the foreign matter is detected by the capacitance change amount XB, and ends the process of the foreign matter detection after outputting warning data to outside, for example.

If it is determined in step 101 that there is the response in the region A, it is necessary to determine whether the response is caused by the foreign matter or noise or the like. Because the response is detected in the region A, the influence caused by the movement of the movable units 15, 16 is small. Therefore, in step 107, the control circuit 40 compares a capacitance change amount XA (which corresponds to a capacitance change amount in the region A) detected at this time in the drive and detection circuit 43 with a predetermined slice value (threshold value) TH1. When the capacitance change amount XB is equal to or less than the slice value TH1, it is determined that the capacitance change is not caused by the foreign matter, and the control circuit 40 repeats the processes from step 101 to uninterruptedly and repeatedly execute the process of the foreign matter detection. On the other hand, in step 107, if the capacitance change amount XA exceeds the slice value TH1, the control circuit 40 determines in step 108 that the foreign matter is detected by the capacitance change amount XA, and ends the process of the foreign matter detection after outputting warning data to outside, for example.

In the process illustrated in FIG. 4, the region B receives the influence of the movable units 15, 16, and thus, the slice value TH2 regarding the region B is relatively a low sensitivity value, as compared to the slice value TH1 regarding the region A. A magnitude relationship between the TH1 and the TH2 cannot be indicated uniquely because it relies on an area ratio between the region A and the region B or the like; however, as a tendency, the slice value TH2 is set to be larger. Further, the change in capacitance is detected in steps 101, S103, but to avoid the influence of noise or the like, the change is continued to be recognized as the response when a certain amount of time has passed from the initial capacity value. Although not illustrated here, the slice value TH2 may be differed depending on whether the card 10 is inserted through the card passage or not. When the card 10 is placed in the card passage, in addition to the influence of the card 10 itself, a width narrowing member configured to align the card 10 in its width direction slightly moves and the movable units 15, 16 move in a respectively separating direction, and thus, these respects may be considered when the slice value TH2 is determined.

The determination as to whether the width narrowing member or the movable units 15, 16 are returned to the original position (position at a time before the card 10 is inserted into the card passage channel) after the card 10 is removed from the card passage channel is not easily made depending only on the detection result of the capacitive sensor 25; however, if the capacitance value detected by the capacitive sensor 25 is returned to the initial value, the movable units 15, 16 or the like are returned to the original position. As a result, it is possible to determine that there is no foreign matter. Further, if the capacitance value is not returned to the initial value after the card 10 is removed from the card passage channel, it is possible to suspect that the foreign matter is inserted. In that case, if the capacitance value stays within a range of a value assumed by the movement of the width narrowing member and the movable units 15, 16, at least a warning may be issued, but if the capacitance value stays within the range of the assumed value, the determination of the foreign matter detection is not finalized.

Figure 5:
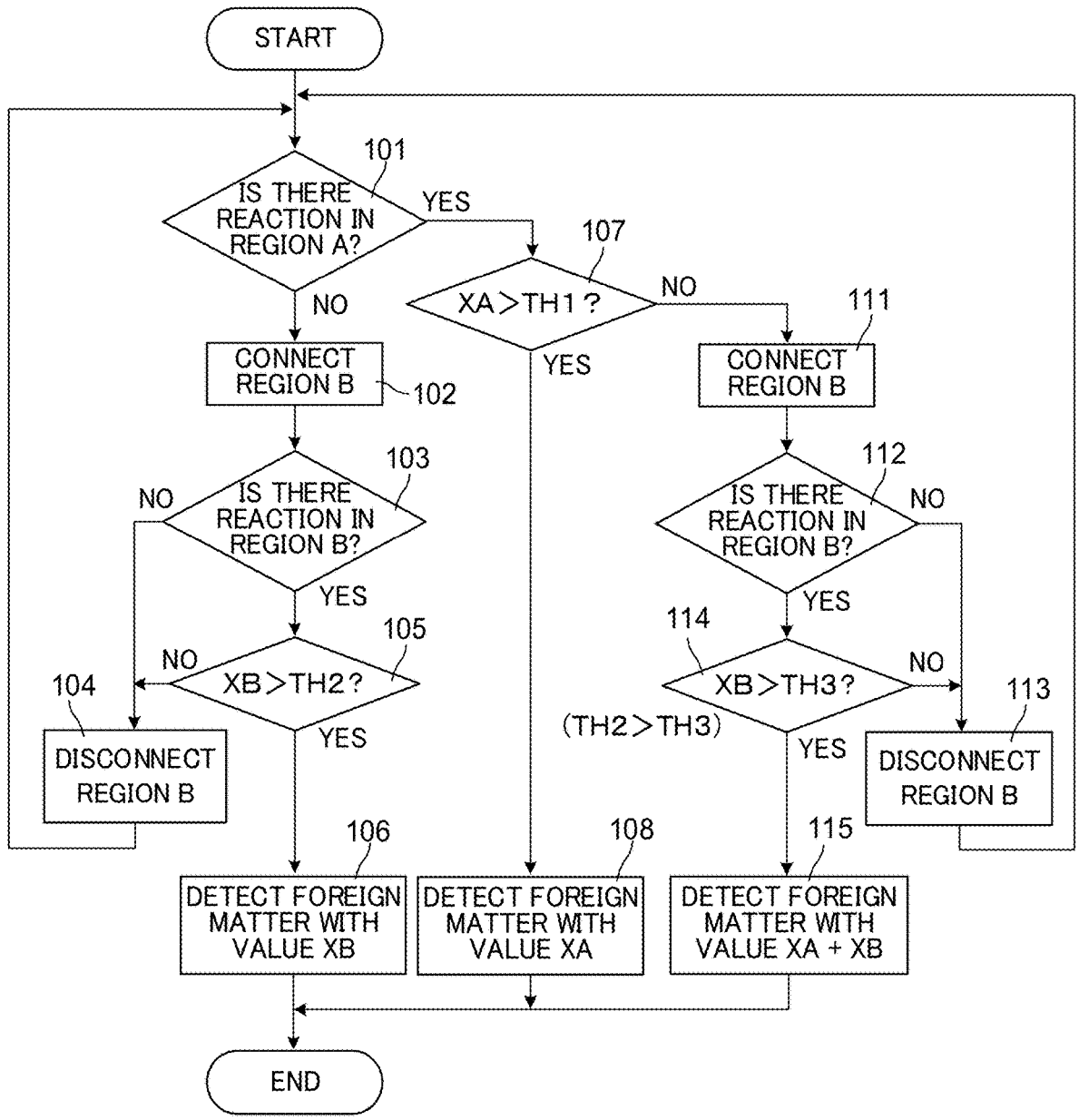
FIG. 5 is a flowchart illustrating another example of the process of the foreign matter detection.

Next, FIG. 5 is used to describe another example of the process executed by the control circuit 40 to detect the foreign matter within the card reader. In the process illustrated in FIG. 4, as described above, the foreign matter is detected at a relatively high sensitivity in the region A, and thus, an erroneous detection may result. Therefore, in the process illustrated in FIG. 5, generation of the erroneous detection is reduced while enabling a reliable foreign matter detection. In the process illustrated in FIG. 5, steps 101 to 106 are similar to steps 101 to 106 in the process illustrated in FIG. 4. If determining in step 101 that there is the response in the region A, similarly to a case as illustrated in FIG. 4, in step 107, the control circuit 40 compares capacitance change amount XA, regarding the region A, detected in the drive and detection circuit 43 with the predetermined slice value TH1, and if XA>TH1, in step 108, the control circuit 40 determines that the foreign matter is detected by the capacitance change amount XA, outputs the warning data to outside, for example, and ends the process of the foreign matter detection.

In step 107, if the capacitance change amount XA is equal to or less than the slice value TH1, different from the process of FIG. 4, in step 111, the control circuit 40 outputs the control signal and renders the switch circuit 33 conducted to ensure that the region B is connected via the region A to the drive and detection circuit 43. Then, in step 112, the control circuit 40 determines, from a sum of the initial value including the region B and the change amount obtained in step 101, whether there is a further change in capacitance value, before and after the region B is connected. The change of the capacitance value from the sum of the initial value including the region B and the change amount obtained in step 101 equals to the response in the region B. In step 112, if there is no change in the region B, it is determined that the response in the region A is not caused by the detection of the foreign matter, and in step 113, the control circuit 40 renders the switch circuit 33 non-conducting and disconnects the region B from the region A. Then, in order to repeatedly execute the process of detecting the foreign matter, the control circuit 40 repeats the processes from step 101. On the other hand, if there is the response in step 112, the control circuit 40 compares XB with a predetermined slice value TH3, where XB denotes a capacitance change value regarding the region B, in step 114. If the capacitance change amount XB is equal to or less than the slice value TH3, the control circuit 40 determines that the change of the capacitance value in the region A and the region B is not caused by the foreign matter, and moves to step 113, similarly to the above, to further repeat the processes from step 101. If the capacitance change value XB exceeds the slice value TH3 in step 114, in step 115, based on the change of the capacitance value in both the region A and the region B, in other words, determining that the foreign matter is detected by the capacitance change value XA+XB, the control circuit 40 ends the process of the foreign matter detection after outputting the warning data to outside, for example.

Next, the slice values TH1 to TH3 in the process illustrated in FIG. 5 will be described. The slice values TH1 to TH3 correspond to the first to threshold values, respectively. In the process illustrated in FIG. 5, similarly to the process illustrated in FIG. 4, in step 107, the capacitance change value XA of the region A is compared with the slice value TH1. In the process illustrated in FIG. 5, not only the foreign matter detection is performed based only on the region A, but also the foreign matter detection based on the detection result in both the region A and the region B is performed, as illustrated in steps 111 to 115. Therefore, as the slice value TH1 for the foreign matter detection based only on the region A, it is possible to use a larger value (as a detection sensitivity, a low-sensitivity value) than the slice value TH1 used in step 107 of FIG. 4. As a result, although there is no foreign matter, it is possible to eliminate, if not completely, an erroneous detection where it is determined that the foreign matter is detected. Further, in the process illustrated in FIG. 5, in both step 105 and step 114, the capacitance change value XB is compared with the slice value. Again, the slice value TH2 for performing the foreign matter detection based only on the region B is larger (as the detection sensitivity, a low sensitivity value) than the slice value TH3 for performing the foreign matter detection based on the detection result in both the region A and the region B. With this setting, it it is possible to eliminate, if not completely, the erroneous detection.

The process illustrated in FIG. 4 or FIG. 5 is executed for each capacitive sensor 25, if a plurality of capacitive sensors 25 are arranged. In this case, if the foreign matter is detected in any one of the capacitive sensors 25, irrespective of the detection result in another capacitive sensor 25, the control circuit 40 externally notifies the detection of the foreign matter by outputting the warning data, for example. In the capacitive sensor 25, the region A not receiving the influence of the movable units 15, 16 is a region for implementing a reliable determination for the foreign matter detection, and the region B located inside the movable structure approaching area 26 receives the influence of the movable units 15, 16 or the like, and thus, a finalized determination cannot be performed in a range of a value receiving these influences, and somewhat uncertain determination only may be possible; however, a zone with a larger area is used as a region for the determination.

[Effect]

As described above, in the card reader of the present embodiment, the capacitive sensor 25 configured by one pair of comb-shaped electrodes is divided into the first region (region A) arranged outside the movable structure approaching area 26 and the second region (region B) arranged inside the movable structure approaching area 26, for example, these regions are electrically connected by the switch circuit 33, and the drive and detection circuit 43 for the capacitive sensor 25 is arranged to be electrically connected to the first region. In this configuration, the detection of the foreign matter can be unceasingly performed by using the first region, and the detection of the foreign matter can also be performed to correspond to the movable structure approaching area 26, where necessary, without arranging a separate drive and detection circuit. As a result, the number of the drive and detection circuits 43 needed for the capacitive sensor 25 can be reduced, the influence of the movable member inside the card reader can be alleviated, and the foreign matter can be detected over a wide range within the card reader. The capacitive sensor 25 of two-terminal type having one pair of comb-shaped electrodes is used herein; however, the capacitive sensor used in the present invention is not limited to a capacitive sensor of two-terminal type having the comb-shaped electrodes, and irrespective of whether the capacitive sensor is of two-terminal type or four-terminal type, the capacitive sensor of any mode may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card having a magnetic stripe, the card reader comprising:
   a card insertion port;
   a card passage through which the card inserted from the card insertion port passes, the card passage being connected to the card insertion port;
   a magnetic head configured to perform at least one of: recording magnetic data to the magnetic stripe of the card; and reading magnetic data from the magnetic stripe of the card;
   a capacitive sensor provided in contact with the card passage;
   a movable structure structured such that a distance between the movable structure and the capacitive sensor is variable; and
   a drive and detection circuit,
   wherein
   the capacitive sensor comprises a plurality of regions, each of the plurality of regions being structured to detect a capacitance, and a switch circuit configured to electrically connect and disconnect each region of the plurality of regions,
   the plurality of regions comprises a first region arranged in a position and a second region, the first region being arranged in a position less susceptible to an influence of a movement of the movable structure than a position of the second region, the card reader further comprises a control circuit configured to control the switch circuit and detect a foreign matter based on an output from the drive and detection circuit, the control circuit unceasingly connects the first region to the drive and detection circuit to detect a foreign matter, and is configured to:

if there is a response in the first region while the second region is electrically disconnected from the first region, detect the foreign matter, based on a detection amount in the drive and detection circuit by using a first threshold value, if there is no response in the first region while the second region is electrically disconnected from the first region, electrically connect the second region to the first region to detect the foreign matter, based on the detection amount in the drive and detection circuit, by using a second threshold value, and thereafter, electrically disconnect the second region from the first region, and when not able to determine that the foreign matter is detected by the first threshold value, electrically connect the second region to the first region to detect the foreign matter, based on the detection amount in the drive and detection circuit, by using a third threshold value, and thereafter, electrically disconnect the second region from the first region, and the third threshold value is smaller than the second threshold value.

2. The card reader according to claim 1, wherein the drive and detection circuit is configured to drive the capacitive sensor and obtain a capacitance value to be detected by the capacitive sensor, and wherein the drive and detection circuit is connected to the first region.

3. The card reader according to claim 2, wherein other regions of the plurality of regions are connected in series via the switch circuit to a region of the plurality of regions connected to the drive and detection circuit.

4. The card reader according to claim 1, wherein the control circuit is configured to:

if there is a response in the first region while the second region is electrically disconnected from the first region, detect the foreign matter, based on a detection amount in the drive and detection circuit, and if there is no response in the first region while the second region is electrically disconnected from the first region, electrically connect the second region to the first region to detect the foreign matter, based on the detection amount in the drive and detection circuit, and thereafter, electrically disconnect the second region from the first region.

5. The card reader according to claim 1, wherein the card reader comprises a plurality of the capacitive sensors, and the plurality of the capacitive sensors are arranged along a traveling direction of the card in the card passage.

6. The card reader according to claim 5, wherein each of the first regions of the plurality of capacitive sensors is arranged at a first side in a direction orthogonal to the traveling direction of the card, and each of the second regions of the plurality of capacitive sensors is arranged at a second side in the direction orthogonal to the traveling direction of the card opposite to the first side.

7. A card reader for use with a card having a magnetic stripe, the card reader comprising:

a card insertion port;

a card passage through which the card inserted from the card insertion port passes, the card passage being connected to the card insertion port;

a magnetic head configured to perform at least one of: recording magnetic data to the magnetic stripe of the card; and reading magnetic data from the magnetic stripe of the card;

a capacitive sensor provided in contact with the card passage; and a movable structure structured such that a distance between the movable structure and the capacitive sensor is variable, wherein the capacitive sensor comprises a plurality of regions, each of the plurality of regions being structured to detect a capacitance, and a switch circuit configured to electrically connect and disconnect each region of the plurality of regions, the plurality of regions comprises a first region arranged in a position and a second region, the first region being arranged in a position less susceptible to an influence of a movement of the movable structure than a position of the second region, the card reader further comprises:

a drive and detection circuit configured to drive the capacitive sensor and obtain a capacitance value to be detected by the capacitive sensor such that the drive and detection circuit is connected to the first region, and a control circuit configured to control the switch circuit and detect the foreign matter based on an output from the drive and detection circuit, and the control circuit unceasingly connects the first region to the drive and detection circuit to detect the foreign matter.

8. The card reader according to claim 7, wherein the control circuit is configured to:

if there is a response in the first region while the second region is electrically disconnected from the first region, detect the foreign matter, based on a detection amount in the drive and detection circuit, and if there is no response in the first region while the second region is electrically disconnected from the first region, electrically connect the second region to the first region to detect the foreign matter, based on the detection amount in the drive and detection circuit, and thereafter, electrically disconnect the second region from the first region.

9. The card reader according to claim 7, wherein the control circuit is configured to:

if there is a response in the first region while the second region is electrically disconnected from the first region, detect the foreign matter, based on a detection amount in the drive and detection circuit by using a first threshold value, if there is no response in the first region while the second region is electrically disconnected from the first region, electrically connect the second region to the first region to detect the foreign matter, based on the detection amount in the drive and detection circuit, by using a second threshold value, and thereafter, electrically disconnect the second region from the first region, and when not able to determine that the foreign matter is detected by the first threshold value, electrically connect the second region to the first region to detect the foreign matter, based on the detection amount in the drive and detection circuit, by using a third threshold value, and thereafter, electrically disconnect the second region from the first region, and the third threshold value is smaller than the second threshold value.

10. A card reader for use with a card having a magnetic stripe, the card reader comprising:
a card insertion port;
a card passage through which the card inserted from the card insertion port passes, the card passage being connected to the card insertion port;
a magnetic head configured to perform at least one of: recording magnetic data to the magnetic stripe of the card; and reading magnetic data from the magnetic stripe of the card;
a capacitive sensor provided in contact with the card passage; and
a movable structure structured such that a distance between the movable structure and the capacitive sensor is variable,
wherein
the capacitive sensor comprises a plurality of regions, each of the plurality of regions being structured to detect a capacitance, and a switch circuit configured to electrically connect and disconnect each region of the plurality of regions,
the plurality of regions comprises a first region arranged in a position and a second region, the first region being arranged in a position less susceptible to an influence of a movement of the movable structure than a position of the second region,
the card reader further comprises a drive and detection circuit configured to drive the capacitive sensor and obtain a capacitance value to be detected by the capacitive sensor, wherein the drive and detection circuit is connected to the first region,
other regions of the plurality of regions are connected in series via the switch circuit to a region of the plurality of regions connected to the drive and detection circuit,
the card reader further comprises a control circuit configured to control the switch circuit and detect a foreign matter based on an output from the drive and detection circuit, and
the control circuit unceasingly connects the first region to the drive and detection circuit to detect the foreign matter.

11. The card reader according to claim 10, wherein the control circuit is configured to:
if there is a response in the first region while the second region is electrically disconnected from the first region, detect the foreign matter, based on a detection amount in the drive and detection circuit, and
if there is no response in the first region while the second region is electrically disconnected from the first region, electrically connect the second region to the first region to detect, based on a detection amount in the drive and detection circuit, the foreign matter, and thereafter, electrically disconnect the second region from the first region.

12. The card reader according to claim 10, wherein the control circuit is configured to:
if there is a response in the first region while the second region is electrically disconnected from the first region, detect the foreign matter, based on a detection amount in the drive and detection circuit by using a first threshold value,
if there is no response in the first region while the second region is electrically disconnected from the first region, electrically connect the second region to the first region to detect the foreign matter, based on the detection amount in the drive and detection circuit, by using a second threshold value, and thereafter, electrically disconnect the second region from the first region, and
when not able to determine that the foreign matter is detected by the first threshold value, electrically connect the second region to the first region to detect the foreign matter, based on the detection amount in the drive and detection circuit, by using a third threshold value, and thereafter, electrically disconnect the second region from the first region, and
the third threshold value is smaller than the second threshold value.

* * * * *